United States Patent [19]

Reymond

[11] Patent Number: 5,642,412
[45] Date of Patent: Jun. 24, 1997

[54] ISOLATED HIGH IMPEDANCE, DC CURRENT SOURCES FOR TELECOMMUNICATIONS APPLICATIONS

[75] Inventor: Welles Reymond, Waterbury, Conn.

[73] Assignee: General DataComm, Inc., Middlebury, Conn.

[21] Appl. No.: 361,955

[22] Filed: Dec. 22, 1994

[51] Int. Cl.$^6$ .................................................. H04M 19/00
[52] U.S. Cl. ........................ 379/348; 379/398; 379/413; 363/47; 363/125
[58] Field of Search ........................... 379/399, 398, 379/412, 413; 363/48, 86, 126, 47, 44, 125

[56] References Cited

U.S. PATENT DOCUMENTS

| | | | |
|---|---|---|---|
| 3,944,909 | 3/1976 | Reymond | 323/45 |
| 4,959,766 | 9/1990 | Jain | 363/48 |
| 5,014,305 | 5/1991 | Moisin | 379/399 |
| 5,287,262 | 2/1994 | Klein | 363/134 |
| 5,446,347 | 8/1995 | Nilssen | 215/209 |

*Primary Examiner*—Krista M. Zele
*Assistant Examiner*—Jacques M. Saint-Surin
*Attorney, Agent, or Firm*—David P. Gordon

[57] ABSTRACT

An isolated, high impedance, DC current source is provided from a readily available AC type source. The DC current source includes an isolating transformer which receives the AC source signal and provides an isolated AC voltage signal therefrom, a resonant low pass filter which is tuned to the frequency of the AC type source and which takes the AC isolated voltage signal and generates therefrom an AC current source signal, and a rectifier which rectifies the AC current source signal to provide a DC current source signal. A voltage limiting clamp is preferably coupled to the rectifier in order to limit the output voltage to a desired level. The resonant low pass filter is preferably comprised of two substantially equally valued inductors coupled to respective poles of the secondary winding of the isolating transformer, and a capacitor which is coupled to both of the inductors. In one embodiment, the AC type source is a 5 V CMOS clock signal, and the output current source generates a sealing current of between 4 and 10 milliamps for telecommunications equipment. In another embodiment, the AC type source is chosen for a desired voltage and frequency, and a plurality of DC current source circuits are coupled to the AC type source in order to distribute power to repeaters or other remote equipment.

20 Claims, 6 Drawing Sheets

ISOLATED HIGH IMPEDANCE, DC CURRENT SOURCES FOR TELECOMMUNICATIONS APPLICATIONS

BACKGROUND OF THE INVENTION

1. Field of the Invention

The present invention relates generally to DC current sources. More particularly, the present invention relates to circuits which generate high impedance direct currents from commonly available alternating current type signals, where the direct currents generated are used in telecommunications applications.

2. State of the Art

Historically, many applications have existed in the telephone local loop environment where it is desirable to generate power from the central office (CO) which will power remote station equipment or repeaters over the same wires used for communications. A conventional telephone is a common application where a 48 V station battery is used to power remote site telephones. Other applications include the transmission of power which is necessary in conjunction with standard T1 loops, and power used in generating a "sealing current" in basic rate two-wire ISDN and the four-wire DDS services for purposes of maintaining splice integrity (i.e., sealing), indicating loop continuity, and signaling.

With regard to T1 loops, because several watts need to be generated, and because it is impractical using the 48 V station battery to generate and send over reasonable distances more than one watt using standard techniques, the T1 systems typically use higher voltage batteries (e.g., 120 V). Such prior art systems use two pairs of wires in which the power is conveyed by a phantom circuit formed by the two two-wire pairs. The use of a 120 V battery to power a loop system, although simple and direct conceptually, poses a number of difficulties and problems. For example, there is no DC isolation between the individual circuits and earth. In addition, because 60 V is considered as a maximum safe voltage, the 120 V battery presents human harms issues when present. Further, 120 V batteries are not always available, and even when available are not particularly efficient.

With regard to the sealing currents, the sealing current is sourced at the central office and terminated at the customer premises equipment (CPE). Typically, the amperage of the sealing current is defined within a specific range which must be independent of whether or not the loop is shorted or is of maximum length. Because the range must be independent of loop conditions, a source with a relative high impedance, i.e., a current source, is required. Conventionally, in order to provide such a current source, the 48 V (−48 V) central office station battery with a series resistance is utilized in a circuit as shown in prior art FIG. 1. In particular, in prior art FIG. 1, the central office 11 is shown with a transmitter 13, a transmitting transformer 15, a receiver 17, a receiving transformer 19, and first and second resistors 21 and 23. Resistor 21 is coupled between ground and the center tap of the local loop side of the transmitting transformer 15, while resistor 23 is coupled between a −48 V voltage source 24 and the center tap of the local loop side of the receiving transformer 19. The local loop side of the transformers 15 and 19 are shown coupled to the wires 25a, 25b, 25c, 25d of the local loop 25 in a four-wire DDS arrangement. In turn, at the CPE, a data service unit (DSU) 27 is shown with a receiving transformer 29, a receiver 31, a transmitting transformer 33, a transmitter 35, and a termination circuit 37. The receiving transformer 29 of the DSU 27 has one winding coupled to wires 25a and 25b, and its center tap coupled to the termination circuit 37 which provides a load resistance, while the transmitting transformer 33 of the DSU has one winding coupled to wires 25c and 25d, and its center tap coupled to the termination circuit 37.

The circuit shown in simplified format in FIG. 1 generates a sealing current which runs through wires 25a and 25b to the termination circuit 37, and back through wires 25c and 25d. In particular, and as shown in the equivalent circuit of FIG. 2, with a −48 V ±7 V voltage source 24 (which is normally between 43 V and 53 V), and with a load resistance $R_e$ of between 0 and 2500Ω (normally between 1300Ω and 2000Ω) at the termination circuit 37, if it desirable to generate a sealing current between 4 mA and 20 mA, the resistors 21 and 23 must be chosen carefully. In particular, it can be shown that the total resistance $R_g$ of resistors 21 and 23 should be at least 2750Ω, and no more than 7750Ω. Thus, in one extreme situation, where the source voltage is −55 V, and the load resistance is shorted (i.e., $R_e$=0), in order for the maximum sealing current to be 20 mA, the resistance $R_g$ must be equal to at least 2750Ω=55 V/20 mA. In another extreme situation, where the source voltage is −41 V, and the load resistance is 2500Ω, in order for the minimum sealing current to be 4 mA, the resistance $R_g$ must be equal to at most 7750Ω, as 7750Ω–2500Ω=41 V/4 mA.

If resistor $R_g$ is chosen to be a 6000Ω resistor, then with a −48 V source and a short in the load, the power dissipated in the resistor $R_g$ would be 0.384 W. With the same resistor and same source, where the load is the typical 2000Ω, the power dissipated in the resistor $R_g$ would be 0.216 W.

While the sealing current source circuitry of the prior art utilizing the 48 V battery voltage source is effective in providing the desired sealing currents, it is not ideal for several reasons. First, as suggested above, the 48 V source in conjunction with the large resistor $R_g$ undesirably dissipates considerable power. Second, with circuitry using a common 48 V source, connections to ground are required, raising issues of compliance with network regulations, and harms. Third, 48 V sources are not always readily available; and even where available may not be cost effective.

SUMMARY OF THE INVENTION

In accord with the objects of the invention, an isolated, high impedance, DC current source is provided from a readily available AC type source. The DC current source generally comprises an isolating transformer, a resonant low pass filter, and a rectifier. The isolating transformer receives the provided alternating voltage signal, and provides therefrom an isolated, and if desired, scaled AC voltage signal. The resonant low pass filter takes the AC isolated voltage signal and generates therefrom an AC current source signal which is rectified by the rectifier to provide a DC current source signal. Preferably, a voltage limiting clamp is coupled to the rectifier in order to limit the output voltage to a desired level.

In accord with a preferred aspect of the invention, the resonant low pass filter is comprised of two substantially equally valued inductors (L/2) coupled to respective poles of the secondary winding of the isolating transformer, and a capacitor (C) which is coupled to both of the inductors. With the provided arrangement, the filter generates an AC current source where the AC frequency $f_0$ is substantially equal to $1/(2\pi\sqrt{LC})$. The AC current signal is rectified by the rectifier which is comprised of four diodes to create the DC current signal. In turn, the DC current signal is preferably filtered by a ripple filter in the form of a capacitor coupled across the output of the rectifier, and the filtered DC signal is clamped by a Zener diode which is also placed across the output of the rectifier in order to limit the output voltage to a desired level should there be no load on the output. The short-circuited direct current of the simplified ideal system is defined by $I(dc)_{sc} = E/\pi^2 f_o L$, where E is the peak voltage of the AC signal. Given the frequency and peak voltage of the AC signal, and a desired output current, the values of the inductor L and capacitor C are defined.

According to a first embodiment of the invention, the AC type voltage signal used in generating a DC current source signal is a telecommunications, typically 5 V, CMOS clock signal. In the first embodiment, the CMOS clock is provided to a push-pull circuit including two inverters and a AC blocking capacitor which are coupled to one pole of a first wind of the isolating transformer, and another inverter coupled to the other pole of the first wind of the transformer. This push-pull circuit provides the transformer with a peak to peak alternating signal which is twice the voltage of the typically 5 V clock signal. In the first embodiment using the 5 V telecommunications clock, by choosing the values of the capacitor and inductors of the resonant low pass filter properly, a DC current of between four and ten milliamps is generated where the load $R_e$ is between 0 and 2400 ohms.

According to a second embodiment of the invention, a power source of desired voltage $E_1$ and desired frequency $f_1$ is used as the alternating current voltage source for a telecommunications power distribution system. Voltage $E_1$ is preferably chosen so that its peak voltage is less than or equal to 60 V so that it does not exceed the safety limit in the distribution system. In addition, the frequency $f_1$ is chosen in order to reduce the weight and size of the isolating transformer and the inductor of the resonant filter circuit. Thus, while the frequency $f_1$ could be as low as a 60 Hz standard power line frequency, it is advantageously chosen to be considerably higher.

Additional objects and advantages of the invention will become apparent to those skilled in the art upon reference to the detailed description taken in conjunction with the provided figures.

DETAILED DESCRIPTION OF THE PREFERRED EMBODIMENT

Figure 1:
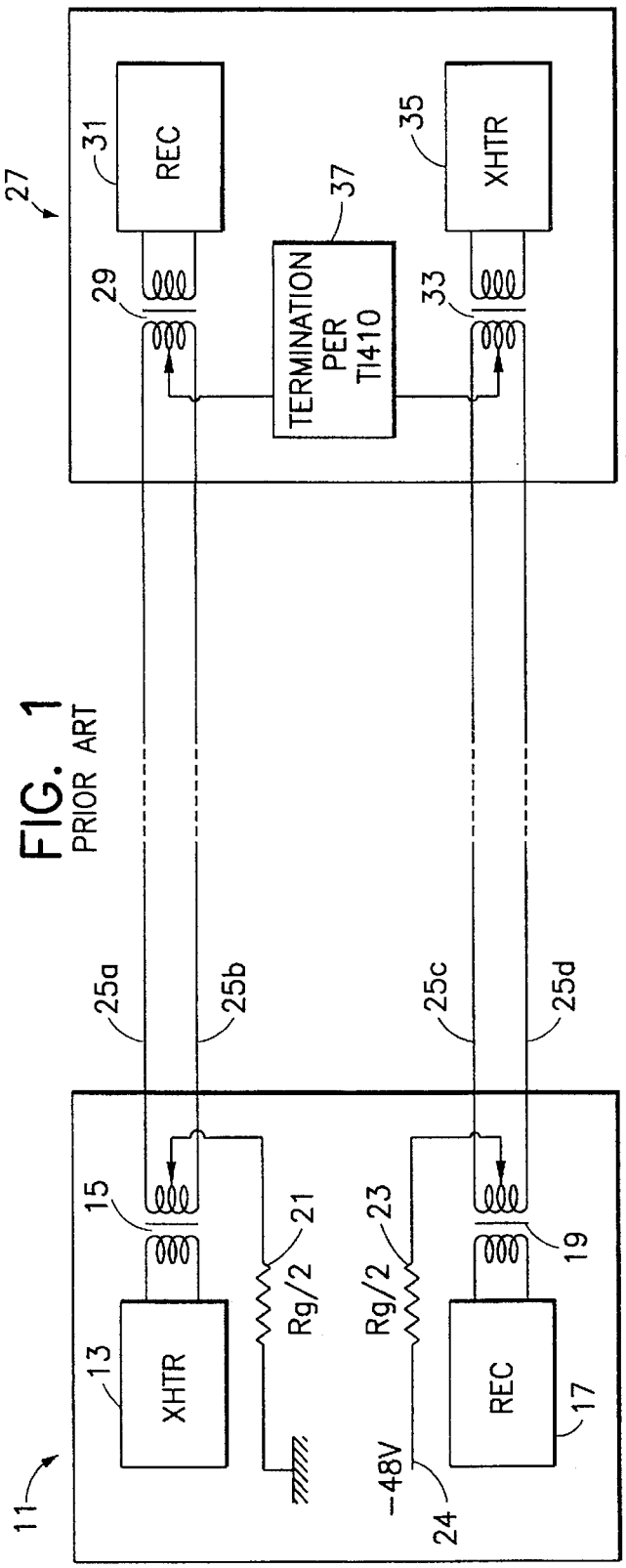
FIG. 1 is a simplified prior art schematic diagram of a DDS circuit utilizing a central office 48 V battery for generating a sealing current.
Figure 2:
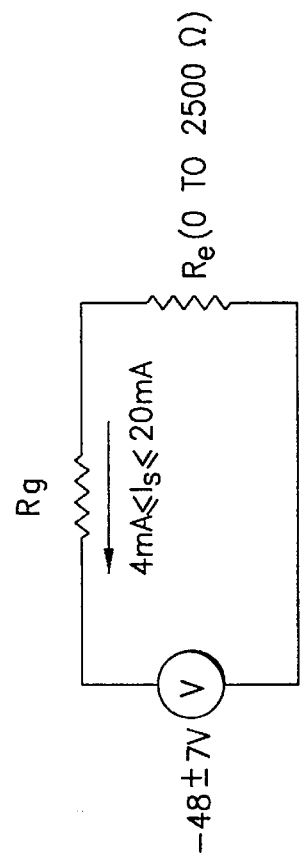
FIG. 2 the prior art equivalent circuit to the simplified diagram of FIG. 1.
Figure 3A:
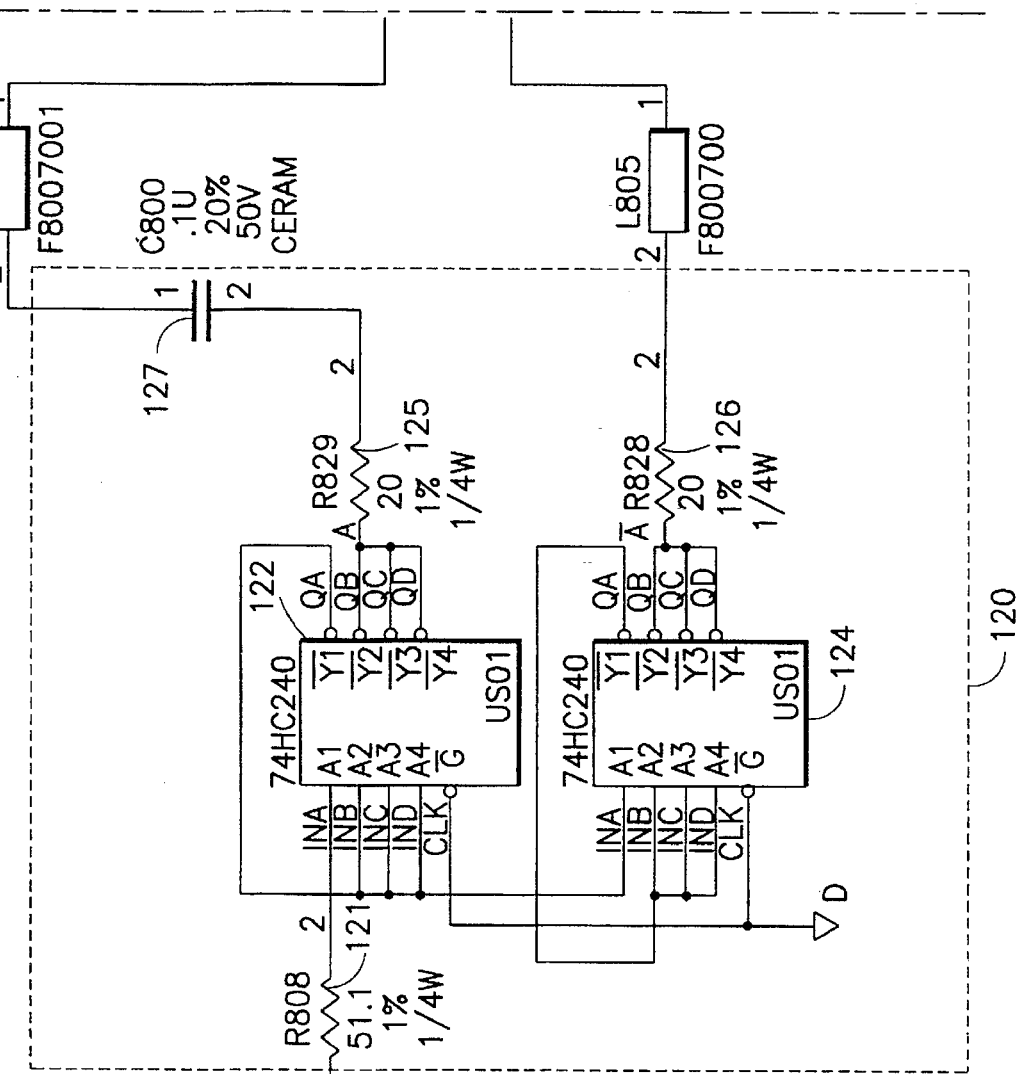
FIG. 3 (represented as FIGS. 3A and 3B on two seperate sheets) is a circuit diagram of the first embodiment of the invention which provides a sealing current.
Figure 3A:
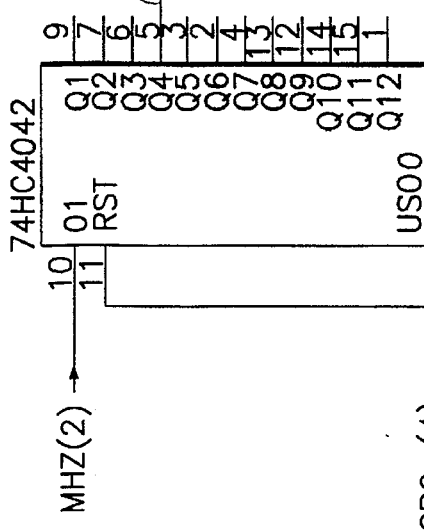
Figure 3B:
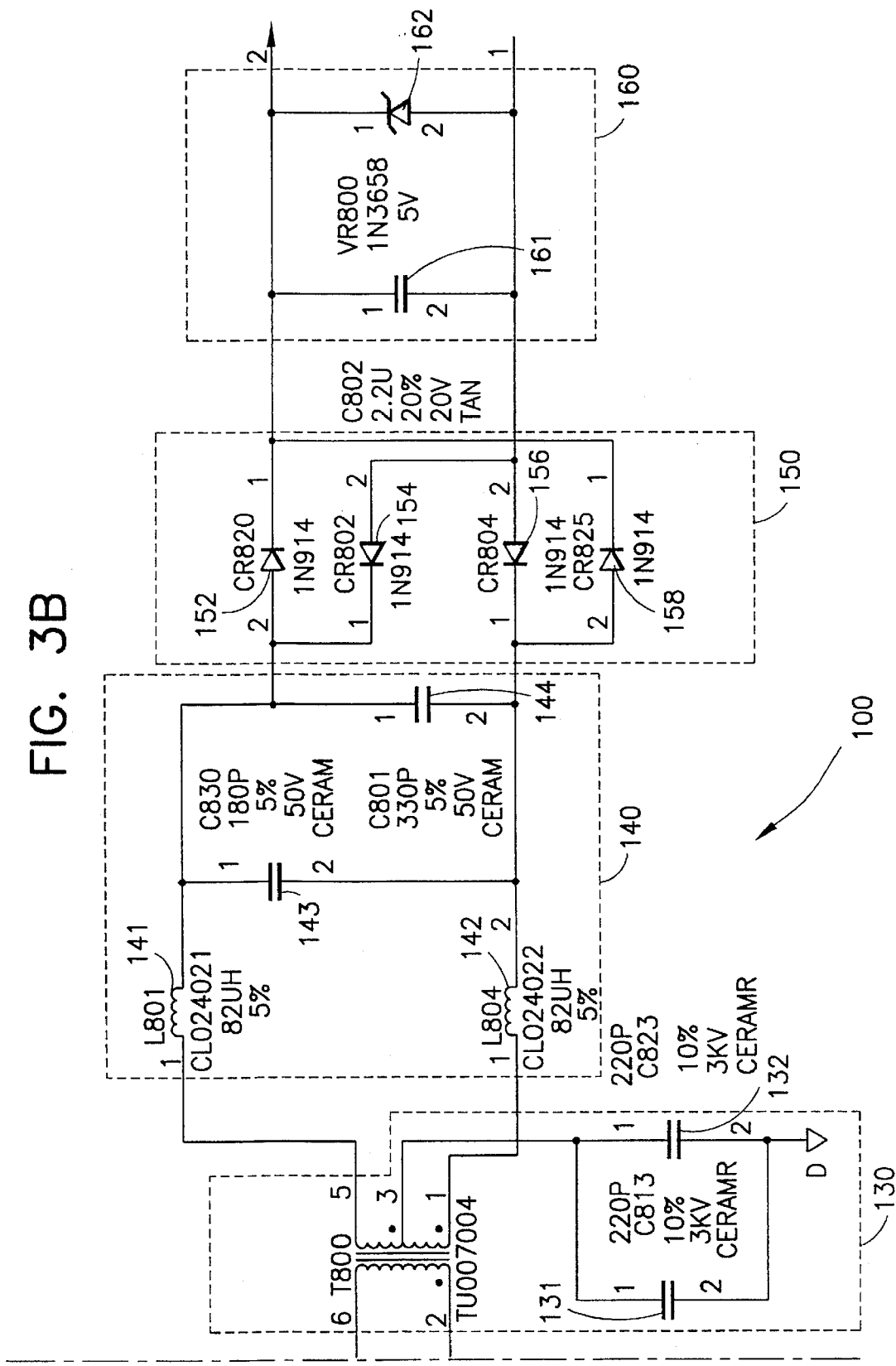

The preferred isolated high impedance, direct current sealing current source 100 of the first embodiment of the invention is seen in FIG. 3. The current source 100 prefer-ably includes a CMOS push-pull circuit 120, an isolation transformer circuit 130, a tuning or resonant filter 140, a full wave rectifier 150, and an output conditioning circuit 160.

As seen in FIG. 3, the input to the CMOS push-pull circuit 120 is a CMOS logic clock 162, which in the provided embodiment is a 504 KHz square wave clock which is generated by a clock generator 164 utilizing an 8 MHz fast clock input. The 504 KHz square wave is provided as the single input to the push-pull protecting circuit 120 which includes a resistor 121, inverter blocks 122, 124, resistors 125 and 126, and a capacitor 127. The resistor 121 is coupled between the output of the clock generator 164 and the inverter blocks 122 and 124. In particular, the A input of block 122 receives the 504 KHz clock signal. The inverter block 122 inverts that signal, and the inverted output is provided as inputs B, C and D of inverter block to inverter block 122 and is input A to inverter block 124. The inverted outputs of inputs B, C, and D of block 122 are tied together and provide the original signal (A) as an output. However, in block 124, the inverted output received at input A, is reinverted by block 124, supplied to ports B,C, and D of block 124 an re-reinverted to provided an output (not A) which is the opposite of the original clock signal. After feeding output A through the resistor 125 and the AC blocking capacitor 127, the A signal is provided to one node of the primary winding of the isolation transformer 130. Likewise, after feeding the not A output through the resistor 126, the not A output is provided to a second node of the primary winding of transformer 130. The transformer when presented with the opposite ("push-pull") signals (0,5 V square wave; 0,–5 V square wave) generates a 10 V peak to peak isolated AC square wave signal on its secondary winding which is provided to the tuning filter circuit 140. It is noted that the central tap of the secondary winding of the isolation transformer 130 is coupled to ground via EMI suppression capacitors 131, 132, if necessary.

The tuning or resonant filter circuit 140 as shown is comprised of inductors 141, 142 and capacitors 143, 144. The inductors 141 and 142 are preferably of equal size (e.g., 82 microhenries) and are coupled to respective output nodes of the secondary winding of transformer 130. Bridging the inductors 141, 142 are capacitors 143 and 144 which are arranged in parallel to provide a desired capacitance (e.g., 510 picofarads) with common sized capacitors (e.g., 180 picofarads, and 330 picofarads). With the provided arrangement of inductors and capacitors, the tuning filter circuit is substantially tuned near the 504 KHz frequency of the square wave clock (i.e., $f_0 = 1/(2\pi\sqrt{LC}) = 550$ KHz, although other parasitic inductances and capacitances, and the leakage inductance of the transformer tend to make the tuned frequency closer to 504 KHz), and effectively changes the alternating current voltage source into a substantially lossless filtered sine wave AC current source. In other words, by utilizing inductors and capacitors of values which cause the circuit to be tuned to the frequency of the AC signal, a current source is generated from the voltage source without utilizing resistors which dissipate power.

It should be appreciated that in lieu of using separate inductors in the circuit (which has the advantage of providing a common mode filter), a single inductor could be utilized. It should also be appreciated that, although not desirable, the location of the capacitor and the inductor could be reversed, with the capacitor coupled to the first node of the secondary winding (and, if desired, a second capacitor coupled to the second node) of the isolation transformer, and the inductor coupled between and bridging the capacitors. While such an arrangement is functional, it has the disadvantage that it will admit high frequency signals.

Regardless of how the tuning filter circuit 140 is arranged, the output of the tuning filter circuit 140 is provided to the full wave rectifier 150 which includes diodes 152, 154, 156, and 158 which arranged in a standard rectifying format. The full wave rectifier 150 takes the low pass filtered AC current source signal and generates therefrom a desired DC current source signal which provides a current to the CPE load of a value between the desired four and ten milliamps DC to the CPE load, substantially regardless of the CPE load. The rectified AC current source signal is then subjected to an output conditioning circuit 160 which includes a filtering capacitor 161 and a Zener diode 162. The capacitor 161 of the output conditioning circuit 160 serves to filter out any ripples which might arise in the rectified AC current source signal, while the Zener diode 162 serves to limit (i.e., clamp) the open circuit voltage and save power if no load is present at the CPE.

It can be shown that in the simplified ideal circuit, the short-circuited direct current of the system (i.e., where the CPE load is zero ohms) is defined by $I(dc)_{sc} = E/\pi 2 f_0 L$, where E is the peak voltage of the fundamental (i.e., $E=5(4/\pi)$ for a 5 V square wave), and $f_0$ is the frequency of the AC signal (i.e., the resonant frequency), and where L is the value of the inductor of the resonant filter. Given, the peak voltage of $5(4/\pi)$V, an input frequency of 504 KHz, and an inductance of 164 microhenries, the short-circuited direct current for the simplified ideal circuit would be approximately 7.7 milliamps. In a real circuit where diode losses and finite Q's are present, the actual direct current will actually be more on the order of approximately 6 milliamps. It can also be shown that with the resonant filter circuit, the current generated by the current source of the system is substantially equal to the 6 milliamps regardless of whether the load is zero ohms or 2400Ω.

Figure 4:
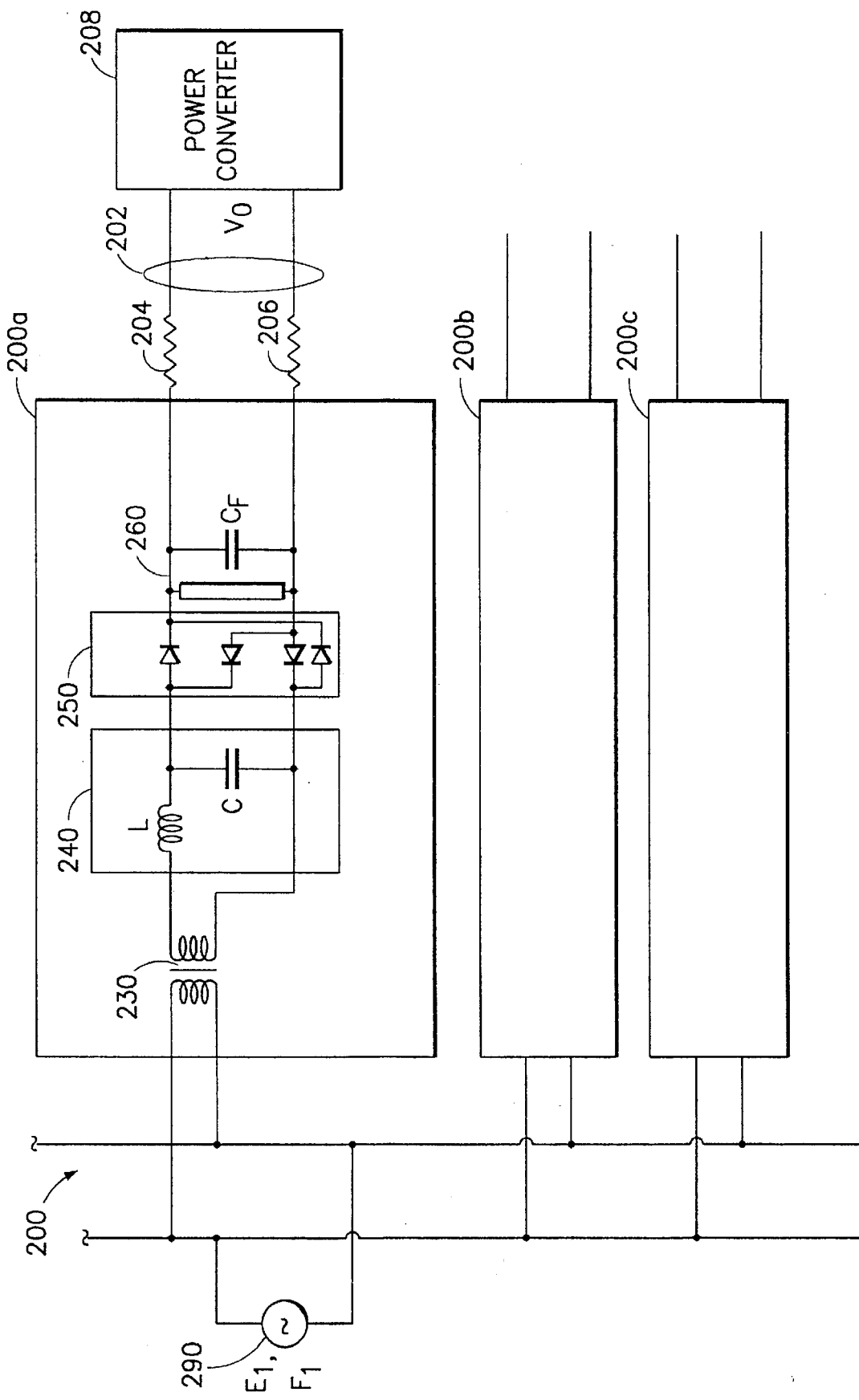
FIG. 4 is a circuit diagram of a second embodiment of the invention which provides a loop power distribution system.

Turning now to FIG. 4, and in accord with a second embodiment of the invention, a simplified schematic diagram of a loop power distribution system 200 for telecommunications circuits is seen. The loop power distribution system 200 provides power over a plurality of loops 202 (one loop indicated by lines with resistors 204, 206) to a plurality of power converters or repeaters 208. The loop power distribution system 200 basically includes a plurality of circuits 200a, 200b..., each having the same elements as the sealing current embodiment, with an isolation transformer circuit 230, a tuning or resonant filter 240, a full wave rectifier 250, and an output conditioning circuit 260. Of particular interest in FIG. 4, is that the parameters of the AC power source 290 which is common to all of the circuits 200a, 200b, ... can be chosen as desired, and implemented using a wide range of technology (e.g., a motor driven alternator; an electronic inverter; etc.). In fact, if desired, the voltage source can be taken directly from a common, standard 60 Hz, 110 V power source, or generated therefrom. Preferably, the voltage $E_1$ is chosen so that the peak voltage (i.e., the maximum going high voltage) is less than or equal to 60 V which would place it within safety limits in the distribution system. In addition, the frequency $f_1$ can be chosen in order to reduce the weight and size of the isolating transformer and the inductor of the resonant filter circuit, as well as to avoid voice frequency interference. Thus, while the frequency $f_1$ could be as low as a 60 Hz standard power line frequency, it is advantageously chosen to be considerably higher (e.g., 300 Hz to be below voice frequency, or 6 kHz or higher to be above voice frequencies). As frequencies are increased, the sizes of the inductor and transformer can be decreased. In fact, almost regardless of the frequency, the inductor of the resonant circuit can be eliminated completely by particularly designing the transformer so that its leakage inductance provides the desired inductance for the resonant filter circuit.

Figure 6:
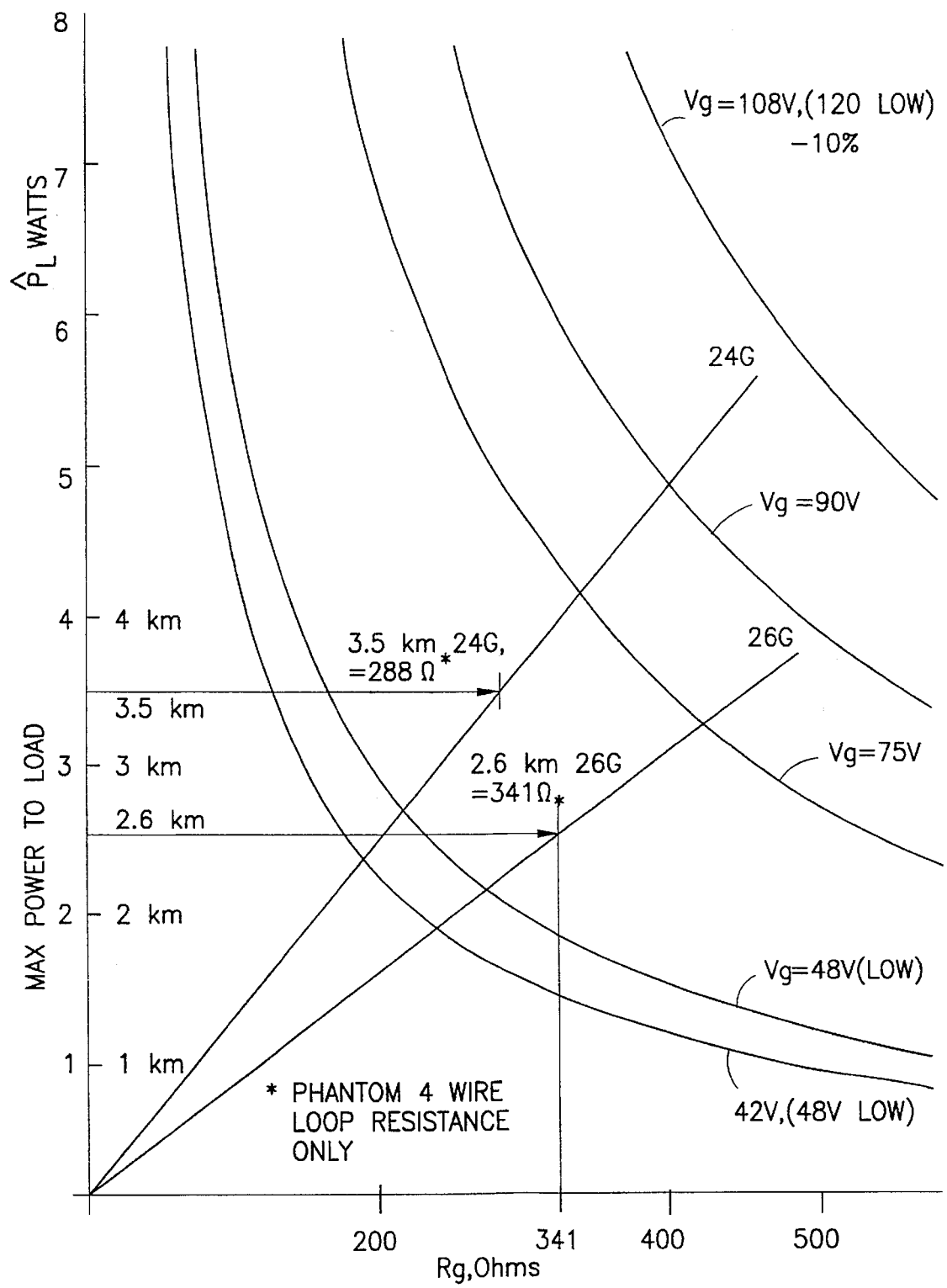
FIG. 6 is a cross plot relating source voltages needed to provide amounts of power to a load to phantom four wire loop resistance, as well as relating the resistances of different gage wires to loop distances.

It should be appreciated that the individual loop power server units are in principle lossless in normal operation as the isolation and voltage to current conversion are done in the alternating current domain with inductors and capacitors and without resistors. Thus, the isolation transformer can be either a step up, a step down, or a one-to-one transformer; thereby defining the coefficient K of the transformer. In arrangements where the input voltage $E_1$ is 40 V rms (56 V peak), the equivalent open circuit output voltage (which never is actually allowed to occur) looking into the tuned circuit would be in principle $V=QKKKE_1$. Since Q's of greater than five are easily achieved, it will be appreciated that the rectified output of the circuit can easily reach well over 120 V if necessary. By way of comparison, it can be shown that a four wire HDSL loop would require only approximately 90 V at the rectified output to supply 6 W to the terminal equipment at the end of a 2.6 km 26 gage cable. In fact, a plot relating the voltage (curves) needed to provide different amounts of power to a load (the y axis) given the different phantom four wire loop resistance of the source/transmission wires (x axis) is seen in FIG. 6. FIG. 6 also includes lines relating the resistance of different gage wires (24G and 26G) to loop distance (in kilometers). Thus, from the straight lines emanating from the origin in FIG. 6, it can be seen that the phantom four-wire loop resistance of a 2.6 km 26 gage cable is approximately 341Ω. If approximately 6 Watts of power are required at the load, it can be seen that a 90 V source can provide almost 6 W where the source resistance is 341Ω. Similarly, for a 3.5 km 24 gage cable, a phantom four-wire loop resistance of 288Ω is present, and to provide approximately 5 W of power at the load, the source voltage would have to be slightly more than 75 V. It is noted that the maximum power is provided to the load when the resistance of the load ($R_L$) is equal to the phantom resistance of the loop ($R_g'$), with the maximum power $\hat{P}_L' V^2_g/4R_g$ where $V_g$ is the source voltage.

Figure 5:
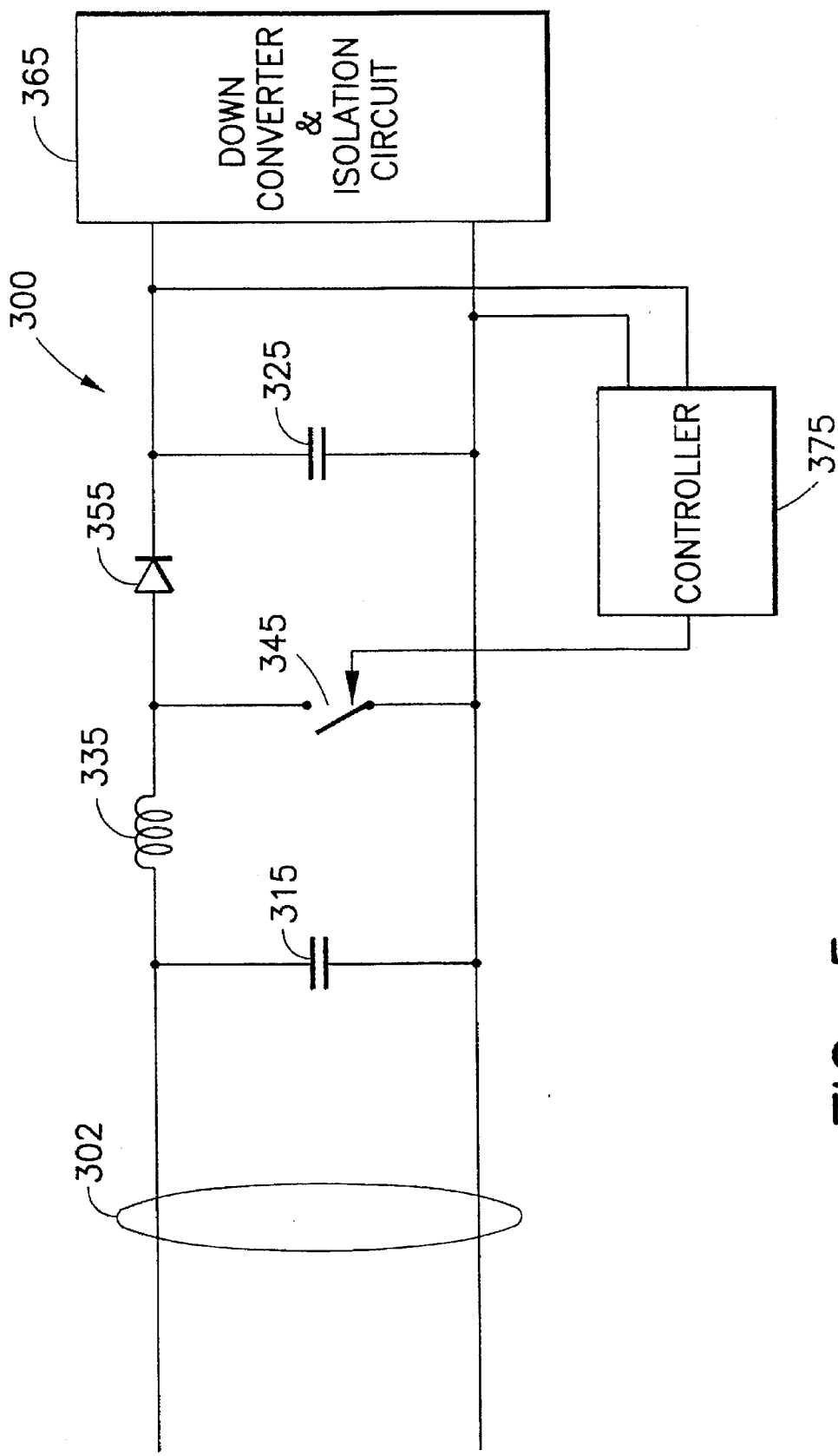
FIG. 5 is a simplified diagram of a shunt switching regulator for a power converter.

The power sent by the power distribution system of FIG. 4 is received at the power converter at the end of the telephone line. The power converter can take any number of well known switching power supply configurations, provided they are adapted to deal with the high DC impedance of the current source, and the wide range of input voltages. However, a preferred power converter for use with the loop power transmission system of FIG. 4 is seen in FIG. 5 in a simplified circuit diagram. In particular, the power converter 300 of FIG. 5 preferably includes two capacitors 315, 325, an inductor 335, a switch 345, a diode 355, a down converter and isolation circuit 365 for the terminal equipment (not shown), and a controller 375. The capacitors 315, 325, and switch 345, are arranged to bridge the telephone wires 302 which are terminated at the down converter 365, while the inductor 335 and the diode 355 are arranged in series along one of the wires. The first capacitor 315 is a filter capacitor which keeps the DC voltage of the telephone line from changing rapidly, thereby preventing inadvertent signalling from taking place. The second capacitor 325 is arranged in conjunction with the switch 345 and the switch controller 375 as a shunt switching regulator to provide a voltage (e.g., 48 V) for use by the down converter 365 which reduces the provided voltage to desired levels for the terminal equipment. The duty cycle of the switch is controlled by the switch controller 375 which senses the voltage being generated across the second capacitor 325 by the inductor 335 which effectively works as a fly-back in order to boost voltage when needed. The switch 345, when closed, acts as a shunt for the current source of FIG. 4. Thus, as opposed to conventional configurations, the switch 345 of the power converter circuit 300 is closed when there is no load, so that there will be no voltage or little voltage generated. Depending upon the values of the components, at maximum load, the switch may be open for most or all of the time.

There have been described and illustrated herein several embodiments of high impedance, DC current sources for telecommunications applications which are generated from AC type signals. While particular embodiments of the invention have been described, it is not intended that the invention be limited thereto, as it is intended that the invention be as broad in scope as the art will allow and that the specification be read likewise. Thus, while a specific preferred circuit was set forth with respect to a sealing current source, it will be appreciated that other circuits could be utilized to provide a sealing current within the invention, provided the sealing current circuit includes the isolation transformer, the resonant filter circuit with the specifically arranged inductor and capacitor, and the rectifier circuit. Also, while specific values of particular elements of the sealing current circuit were provided, it will be appreciated that elements of other values could be utilized, provided that the resonant filter circuit has a resonant frequency substantially near the frequency of the AC input. Indeed, as previously mentioned with reference to the loop power distribution system embodiment, if the isolation transformer is arranged with a specific desired leak inductance, it might be possible to eliminate a separate inductor from the circuit completely, and have the transformer provide the inductance for the resonant filter circuit. In addition, while the sealing current circuit and loop power distribution system circuit were described with reference to particular input frequencies, input voltages, and output currents (and voltages), it will be appreciated by those skilled in the art that the circuits can be tailored to take account of different input or output restraints, and/or to take advantage of particular clocks or other AC voltage sources available at the central office. It will therefore be appreciated by those skilled in the art that yet other modifications could be made to the provided invention without deviating from its spirit and scope as so claimed.

I claim:

1. An isolated, high impedance, DC current source for a telecommunications system having an AC type voltage source of a first frequency, said DC current source comprising:

a) an isolating transformer means having a first winding coupled to the AC type voltage source, and a second winding, said isolating transformer means for providing an isolated AC voltage signal on said second winding;

b) a resonant low pass filter means coupled to said second winding of said isolating transformer, said resonant low pass filter means including a first inductor coupled in series with a first pole of said second winding, and a first capacitor coupled to said inductor and to a second pole of said second winding, said resonant low pass filter means being substantially tuned to the first frequency for providing a substantially AC current source signal; and c) a rectifier coupled to said resonant low pass filter means, said rectifier providing a substantially DC current source output signal over telephone wires.

2. A current source according to claim 1, further comprising:

d) a voltage limiting clamp coupled to said rectifier, wherein said voltage limiting clamp limits an output voltage of said current source to a desired level.

3. A current source according to claim 1, further comprising:

d) a ripple filter capacitor coupled to and bridging an output of said rectifier.

4. A current source according to claim 2, further comprising:

e) a ripple filter capacitor coupled to and bridging an output of said rectifier.

5. A current source according to claim 1, wherein:

said resonant low pass filter means comprises a second inductor which couples said capacitor to said second winding.

6. A current source according to claim 5, wherein:

said first inductor has a first inductance, and said second inductor has a second inductance substantially equal to said first inductance.

7. A current source according to claim 1, wherein:

with said first frequency predetermined, and the AC type voltage having a predetermined amplitude, said low pass resonant filter is arranged with an inductance such that said current source provides a current of between four and ten milliamps when a receiving load is between 0 and 2400 Ω.

8. A current source according to claim 7, wherein:

the AC type voltage source is a telecommunications clock signal.

9. A current source according to claim 1, wherein:

the AC type voltage source is a telecommunications clock signal.

10. A current source according to claim 9, further comprising:

a blocking capacitor coupling said telecommunications clock to a first pole of said first winding of said transformer means.

11. A current source according to claim 10, further comprising:

a push-pull circuit including a first inverter means and a second inverter means, said first inverter means having a first input coupled to said telecommunications clock signal and a first output coupled to said blocking capacitor, and said second inverter means having a second input coupled to said first output of said first inverter means, and a second output coupled to a second pole of said first winding of said transformer means.

12. A current source according to claim 11, wherein:

the AC type voltage source is a substantially 5 V telecommunications clock signal.

13. A current source according to claim 1, wherein:

the AC type voltage source is chosen with a voltage and a frequency, and an inductance of said resonant low pass filter means is chosen such that said current source provides a power of at least 3 W to a remote equipment.

14. An isolated, high impedance, DC current source for a telecommunications system having an AC type voltage source of a first frequency, said DC current source comprising:

a) an isolating transformer means having a first winding coupled to the AC type voltage source, and a second winding, said isolating transformer means for providing an isolated AC voltage signal on said second winding, and said isolating transformer means being arranged for providing a predetermined leakage inductance;

b) a first capacitor coupled to across said second winding of said isolating transformer means such that said isolating transformer means and said first capacitor forms a resonant low pass filter which is substantially tuned to the first frequency and which provides a substantially AC current source signal; and c) a rectifier coupled to first and second plates of said first capacitor, said rectifier providing a substantially DC current source output signal over telephone wires.

15. A telecommunications power distribution system, comprising:

a) an AC voltage source having a first voltage and a first frequency; and b) a plurality of isolated, high impedance, DC current source circuits coupled to said AC voltage source, each comprising i) an isolating transformer means having a first winding coupled to said AC voltage source, and a second winding, said isolating transformer means for providing an isolated AC voltage signal on said second winding, ii) a resonant low pass filter means coupled to said second winding of said isolating transformer, said resonant low pass filter means including a first inductor coupled in series with a first pole of said second winding, and a first capacitor coupled to said inductor and to a second pole of said second winding, said resonant low pass filter means being substantially tuned to the first frequency for providing a substantially AC current source signal, and iii) a rectifier coupled to said resonant low pass filter means, said rectifier providing a substantially DC current source output signal over telephone wires.

16. A telecommunications power distribution system according to claim 15, wherein:

said first voltage has a peak less than or equal to 60 V.

17. A telecommunications power distribution system according to claim 15, wherein:

said first frequency is chosen to be outside telephone voice band.

18. A telecommunications power distribution system according to claim 15, wherein:

each of said plurality of isolated, high impedance, DC current source circuits further comprises iv) a voltage limiting clamp coupled to said rectifier, wherein said voltage limiting clamp limits an output voltage of said current source circuits to a desired level, and v) a ripple filter capacitor coupled to and bridging an output of said rectifier.

19. A telecommunications power distribution system according to claim 18, wherein:

each low pass filter means of said plurality of isolated, high impedance, DC current source circuits includes a second inductor which couples said capacitor to said second winding.

20. A telecommunications power distribution system according to claim 15, further comprising:

a plurality of power converters respectively coupled to said plurality of isolated, high impedance, DC current source circuits via telephone line couples, each of said plurality of power converters comprising a second inductor, second and third capacitors, a switch, and a down converter, said second capacitor being coupled across a telephone line couple, said second inductor being coupled to a first plate of said second capacitor, said switch being coupled between said second inductor and a second plate of said second capacitor, said third capacitor and said down converter being arranged in parallel with each other and with said switch.

* * * * *